United States Patent
Krauthamer

(10) Patent No.: US 10,818,090 B2
(45) Date of Patent: Oct. 27, 2020

(54) AUGMENTED REALITY SYSTEM FOR AN AMUSEMENT RIDE

(71) Applicant: Universal City Studios LLC, Universal City, CA (US)

(72) Inventor: Akiva Meir Krauthamer, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 0 days.

(21) Appl. No.: 16/234,739

(22) Filed: Dec. 28, 2018

(65) Prior Publication Data

US 2020/0211283 A1  Jul. 2, 2020

(51) Int. Cl.
| | |
|---|---|
| *G06T 15/00* | (2011.01) |
| *G06T 19/00* | (2011.01) |
| *A63J 5/02* | (2006.01) |

(52) U.S. Cl.
CPC .............. *G06T 19/006* (2013.01); *A63J 5/02* (2013.01); *G06T 15/005* (2013.01); *G06T 2200/04* (2013.01)

(58) Field of Classification Search
CPC .. A63F 13/2145; A63F 13/26; G06F 3/04842; G06F 3/0304; G06F 3/0488; G06F 3/04815; G09G 3/003; G09G 2300/023; G09G 2354/00
USPC ......................................................... 345/418
See application file for complete search history.

(56) References Cited

U.S. PATENT DOCUMENTS

| | | | |
|---|---|---|---|
| 8,576,276 B2 | 11/2013 | Bar-Zeev et al. | |
| 8,692,738 B2* | 4/2014 | Smithwick ............. | G02B 30/35 345/6 |
| 8,831,780 B2* | 9/2014 | Zelivinski ............ | H04N 21/214 700/257 |
| 8,857,994 B2* | 10/2014 | Smithwick ............. | G02B 30/27 353/7 |
| 9,581,962 B1* | 2/2017 | Duffy ................... | G03H 1/0891 |

(Continued)

FOREIGN PATENT DOCUMENTS

| | | |
|---|---|---|
| KR | 101860680 | 6/2018 |
| RU | 2664781 | 8/2018 |

(Continued)

OTHER PUBLICATIONS

Make: makezin.com, DIY Hacks $ How to's: Peppers Ghost, https://www.youtube.com/watch?v=TcqyoYfHIFM, Published on Sep. 30, 2013.*

(Continued)

*Primary Examiner* — Phu K Nguyen
(74) *Attorney, Agent, or Firm* — Fletcher Yoder, P.C.

(57) ABSTRACT

An augmented reality system for an amusement ride includes a guest-tracking sensor configured to determine a position of a guest, a projector configured to project imagery, a semi-transparent mirror configured to reflect the imagery as augmented reality imagery, and a controller including a processor and a memory. The controller is configured to receive a sensor signal indicative of the position of the guest from the guest-tracking sensor, generate image data based on the position of the guest, and output a control signal indicative of the image data to the projector. The projector is configured to project the imagery based on the control signal indicative of the image data.

20 Claims, 3 Drawing Sheets

(56) References Cited

U.S. PATENT DOCUMENTS

| | | | |
|---|---|---|---|
| 9,819,907 B2* | 11/2017 | McNelley | H04N 7/15 |
| 9,916,794 B2 | 3/2018 | Smithwick | |
| 9,989,777 B1 | 6/2018 | Comploi et al. | |
| 10,298,877 B2* | 5/2019 | McNelley | G06F 3/147 |
| 10,310,274 B1* | 6/2019 | Reichow | G02B 30/27 |
| 10,366,642 B2* | 7/2019 | Reichow | A63F 13/2145 |
| 10,663,724 B1* | 5/2020 | Laduke | G02B 30/26 |
| 10,694,147 B1* | 6/2020 | Bakshi | G06F 3/1454 |
| 2003/0085866 A1 | 5/2003 | Bimber et al. | |
| 2004/0135744 A1 | 7/2004 | Bimber et al. | |
| 2008/0246757 A1 | 10/2008 | Ito | |
| 2010/0253700 A1 | 10/2010 | Bergeron | |
| 2012/0313839 A1 | 12/2012 | Smithwick et al. | |
| 2013/0207896 A1 | 8/2013 | Robinson et al. | |
| 2015/0243083 A1 | 8/2015 | Coggins | |
| 2016/0267577 A1 | 9/2016 | Crowder et al. | |
| 2020/0174277 A1* | 6/2020 | Karafin | G03H 1/268 |
| 2020/0233230 A1* | 7/2020 | Karafin | H04N 13/344 |

FOREIGN PATENT DOCUMENTS

| | | |
|---|---|---|
| WO | 2011045437 | 4/2011 |
| WO | 2011046505 | 4/2011 |

OTHER PUBLICATIONS

Lo WY, Tsai YP, Chen CW, Hung YP. Stereoscopic kiosk for virtual museum. Inin Proceedings of International Computer Symposium 2004.*

Chan LW, Ye WS, Liao SC, Tsai YP, Hsu J. A flexible display by integrating a wall-size display and steerable projectors. Lecture notes in computer science. 2006:21-31.*

Carrozzino M, Bergamasco M. Beyond virtual museums: Experiencing immersive virtual reality in real museums. Journal of Cultural Heritage. Oct. 1, 2010;11(4):452-8.*

PCT/US2019/067659 International Search Report and Written Opinion Apr. 2, 2020.

* cited by examiner

AUGMENTED REALITY SYSTEM FOR AN AMUSEMENT RIDE

BACKGROUND

The present disclosure relates generally to an augmented reality system, and more particularly to an augmented reality system for an amusement ride.

In some cases, an amusement ride may include displaying augmented reality-based (AR) images viewable by a guest. For example, the amusement ride may include a display positioned adjacent to the guest. The display may output the AR images for viewing by the guest. For certain rides, the AR images may be three-dimensional (3D). The guest may wear an augmented reality headset or helmet that enables the guest to properly view and experience the 3D AR images. However, traditional AR or 3D AR headsets and helmets for amusement rides may be expensive. Additionally, AR headsets may need to be cleaned after use by each guest. As such, it is now recognized that traditional AR headsets may increase operating costs and other inefficiencies associated with the amusement ride, and guests may experience increased queue times for the amusement ride.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an augmented reality system for an amusement ride includes a guest-tracking sensor that determines a position of a guest, a projector that projects imagery, a semi-transparent mirror that reflects the imagery as augmented reality imagery, and a controller including a processor and a memory. The controller receives a sensor signal indicative of the position of the guest from the guest-tracking sensor, generates image data based on the position of the guest, and outputs a control signal indicative of the image data to the projector. The projector projects the imagery based on the control signal indicative of the image data.

In an embodiment, a method for generating augmented reality imagery for an amusement ride includes receiving an indication of a position of a guest and, in response to receiving the indication of the position of the guest, generating image data based on the position of the guest. The method also includes projecting imagery, based on the image data, onto a semi-transparent mirror and reflecting the imagery as augmented reality imagery toward the guest for viewing by the guest. The augmented reality imagery appears as three-dimensional (3D) imagery when viewed through 3D eyewear.

In an embodiment, an augmented reality system for an amusement ride includes a guest-tracking sensor that determines a position of a guest, a three-dimensional (3D) projector that projects imagery, a semi-transparent mirror that reflects the imagery as augmented reality imagery, 3D eyewear, and a controller including a processor and a memory. The controller receives a sensor signal indicative of the position of the guest from the guest-tracking sensor, generates image data based on the position of the guest, and outputs a control signal indicative of the image data to the 3D projector such that the control signal causes the 3D projector to project the imagery onto the semi-transparent mirror based on the image data.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
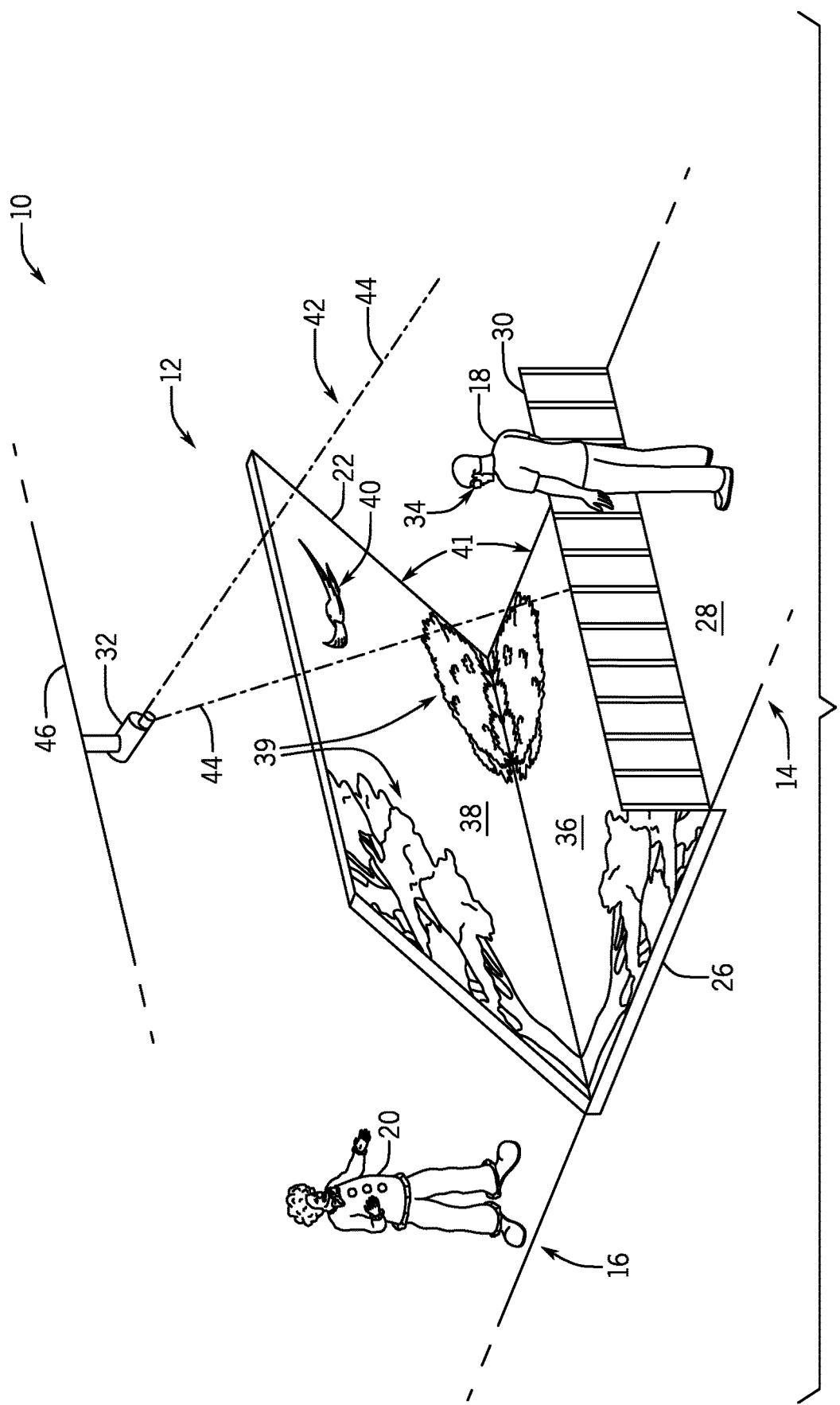
FIG. 1 is a perspective view of an embodiment of an amusement ride system having an augmented reality system, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

To replicate or simulate augmented reality effects without using an augmented reality headset, an augmented reality system may include a projector that may project imagery from a screen (or projection screen). The imagery may be reflected by a semi-transparent mirror as augmented reality imagery. A guest may view the augmented reality imagery as 3D imagery or a 3D environment using 3D eyewear (e.g., 3D glasses). The semi-transparent mirror may be positioned at an angle relative to the guest's face and the projector to create a Pepper's ghost effect. The Pepper's ghost effect includes reflecting imagery via a mirror such that a viewer may simultaneously view the 3D imagery on the mirror and objects located on an opposite side of the mirror. The Pepper's ghost effect may cause the 3D imagery to appear overlaid on top of any objects behind the semi-transparent mirror. Further, the guest's head may be tracked, and the position of the guest's head relative to the semi-transparent mirror and the objects behind the semi-transparent mirror may be used to update the 3D imagery displayed on the semi-transparent mirror. For example, as the guest moves their head, the 3D imagery may include a parallax effect that accurately moves portions of the 3D imagery relative to each other and relative to the objects behind the semi-transparent mirror (e.g., portions of the 3D imagery that appear closer to the guest may move more than portions of the 3D imagery that appear farther from the guest). In this manner, an augmented reality effect may be generated which is viewable by the guest when merely wearing a lightweight 3D eyewear, instead of an augmented reality headset.

With the foregoing in mind, the present embodiments relating to an augmented reality system may be utilized in any amusement ride or attraction system. For example, FIG. 1 is a perspective view of an embodiment of an amusement ride system 10 having an augmented reality system 12. As illustrated, the amusement ride system 10 includes the augmented reality system 12, a viewing area 14, and a performance area 16. The viewing area 14 provides an area for guest(s) of the amusement ride system 10 to stand and/or sit while positioned within the amusement ride system 10. As illustrated, a guest 18 is standing in the viewing area 14. The performance area 16 provides an area for real or live object(s) 20 within the amusement ride system 10 to perform. In the illustrated embodiment, the object 20 includes an entertainer positioned within the performance area 16. The objects 20 (e.g., the entertainer) within the performance area 16 are viewable from a perspective of the guest 18, and may include live objects (e.g., the entertainer), inanimate objects, machines (e.g., animated figures, vehicles, and other moving systems), and/or any other suitable objects that may be used in a performance. It should be understood that, in some embodiments, there may not be a performance area 16 or there may be no objects 20 positioned within the performance area 16. Further, while the present disclosure refers to the amusement ride system 10, it should be understood that the disclosed embodiments may be applied to any suitable environment, such as a theater, show, or entertainment venue where guests may stand or sit in relatively fixed positions, and not only a ride or vehicle where guests may be moving.

The augmented reality system 12 may generate and provide certain augmented reality effects within the amusement ride 10, including augmented reality imagery that appears to interact with certain portions of the amusement ride 10 (e.g., the objects 20) from a perspective of the guest 18. As illustrated, the augmented reality system 12 includes a semi-transparent mirror 22, a projector 26, a guest-tracking sensor 32, and a three-dimensional (3D) eyewear assembly 34. The projector 26 may project imagery 36 that appear as 3D imagery or a 3D environment when viewed through 3D eyewear. For example, the projector 26 may be a 3D projector that projects a pair of 2D images (e.g., the imagery 36) with particular color schemes (e.g., red and blue, respectively). The 2D images may appear to be the 3D environment when viewed through the 3D eyewear 34. In the illustrated embodiment, a single projector is used and is positioned below the semi-transparent mirror 22, which is angled to reflect imagery from the projector 26. However, in other embodiments, multiple projectors at different orientations may be employed.

In the illustrated embodiment, the projector 26 is at a same generally vertical level as a floor 28. However, in certain embodiments, the projector 26 may be located underneath the floor 28, on a ceiling, on a barrier 30, or in any other suitable position. Further, the projector 26 may be disposed generally parallel to the floor 28 of the viewing area 14, and/or the projector 26 may be disposed significantly lower than the floor 28 (e.g., several meters lower than the floor 28). In some embodiments, the projector 26 may include any suitable type of display or screen, such as an LED (light emitting diode) display, an OLED (organic LED) display, or an LCD (liquid crystal display). As illustrated, the projector 26 is disposed on an opposite side of the barrier 30 relative to the viewing area 14. The barrier 30 may hide the projector 26 from view of the guest 18 while the guest 18 is positioned within the viewing area 14.

The projector 26 may cause augmented reality imagery 38 to appear on the semi-transparent mirror 22. For example, the semi-transparent mirror 22 may reflect the imagery 36 as the augmented reality imagery 38 for viewing by the guest 18. As such, the augmented reality imagery 38 may include a reflected pair of 2D images (e.g., the imagery 36) that appear to be the 3D environment from the perspective of the guest 18 wearing the 3D eyewear 34. Additionally, the semi-transparent mirror 22 may be semi-transparent such that the guest 18 is able to simultaneously view the augmented reality imagery 38 and the objects 20 in the performance area 16. The semi-transparent mirror 22 may be composed of glass or another suitable material that enables display of the (opaque) augmented reality imagery 38 but otherwise remains transparent. As illustrated, the augmented reality imagery 38 includes scenery 39 (e.g., a tree and a bush) and a bird 40. From the perspective of the guest 18, the object 20 may appear to be part of the augmented reality imagery 38 (or vice versa) and may appear to interact with the augmented reality imagery 38 (e.g., interact with the scenery 39 and/or the bird 40). For example, the object 20 may appear to be part of the 3D environment of the augmented reality imagery 38 from the perspective of the guest 18 wearing the 3D eyewear 34. In certain embodiments, the augmented reality imagery 38 may include other types of images/objects (e.g., characters, weather, structures, vehicles, signs) in addition to or in place of the scenery 39 and the bird 40.

The imagery 36 is thus reflected by and/or projected onto the semi-transparent mirror 22 as the augmented reality imagery 38. The guest 18 may wear the 3D eyewear 34 while positioned within the amusement ride 10 and while viewing the semi-transparent mirror 22. In certain embodiments, the 3D eyewear 34 may be a wireless headset that facilitates wearing and removal by the guest 18 (e.g., the 3D eyewear 34 may be a pair of 3D glasses that enable the guest 18 to view the 3D environment). For example, the 3D eyewear 34 may be stereoscopic glasses that enable the guest 18 to view the imagery 36 as the 3D environment, such as via interference filters that filter out specific wavelengths of light for each eye of the guest 18 (e.g., spectral comb filtering, wavelength multiplex visualization, super-anaglyph, etc.), polarization filters that block a portion of light viewable by one or both eyes of the guest 18, filters of different colors (e.g., red and cyan, blue and yellow, etc.), and/or an active shutter system that alternates blocking the vision of the guest 18 between the left eye and right eye. The guest 18 may easily put the 3D glasses on prior to or after entering the viewing area 14, may view the object 20 and the 3D environment of the augmented reality imagery 38 with the 3D eyewear 34, and may easily remove the 3D glasses upon exiting the viewing area 14. The guest 18 may be provided with the 3D eyewear 34 upon entering the viewing area 14 and may return the 3D eyewear 34 upon exiting the viewing area 14.

The projector 26 and the semi-transparent mirror 22 may provide the augmented reality imagery 38 such that the augmented reality imagery 38 appears "real" and the semi-transparent mirror 22 appears to be invisible from the guest's perspective. In some cases, this is achieved by the projector 26 and the semi-transparent mirror 22 creating a Pepper's ghost effect. That is, the imagery 36 projected by the projector 26 is reflected by the semi-transparent mirror 22, which is viewed as the augmented reality imagery 38 from the guest's perspective. The object 20 behind the semi-transparent mirror 22 may appear, from the guest's perspective, to be part of the augmented reality imagery 38 (e.g., may appear to be part of the 3D environment of the augmented reality imagery 38).

To achieve this effect (e.g., the Pepper's ghost effect), the semi-transparent mirror 22 may be disposed at an angle 41 relative to the projector 26 that enables the semi-transparent mirror 22 to reflect the imagery 36 for viewing by the guest 18. As such, the angle 41 may vary depending on certain dimensions of the amusement ride system 10 (e.g., a distance between the guest 18 and the semi-transparent mirror 22, dimensions of the semi-transparent mirror 22 and the projector 26, sizes of the viewing area 14 and the performance area 16, and other factors). For example, in certain embodiments, the angle 41 may be forty-five degrees, and, in some embodiments, the angle 41 may range from thirty degrees to sixty degrees. In some embodiments, the semi-transparent mirror 22 may extend essentially perpendicularly from the floor and an overhead projector may provide the imagery 36.

While FIG. 1 illustrates the augmented reality imagery 38 reflected by the semi-transparent mirror 22, in some embodiments, the semi-transparent mirror 22 may include the projector 26, such that the projector 26 directly projects the augmented reality imagery 38 on the semi-transparent mirror 22. That is, the semi-transparent mirror 22 may include a "see-through" electronic display that enables the guest 18 to see through it and to simultaneously view the objects 20 and the augmented reality imagery 38. The see-through display may be made of any suitable material, such as glass, and use any suitable display technology, such as LED, OLED, or LCD. Further, the semi-transparent mirror 22 that includes the projector 26 may provide the augmented reality imagery 38 as the 3D environment when viewed through the 3D eyewear 34.

In certain embodiments, the projector 26 may be replaced by physical objects that are reflected by the semi-transparent mirror 22. For example, the physical objects may be positioned in a similar general location of the projector 26 and may appear as the augmented reality imagery 38 on the semi-transparent mirror 22. Such physical objects may include an animated face and/or body. The semi-transparent mirror 22 may reflect the animated face and/or body and movement thereof. Additionally, the performance area 16 may include a blank physical character. The animated face and/or body may be overlaid onto the blank physical character. As such, from the perspective of the guest 18 simultaneously viewing the augmented reality imagery 38 and the performance area 16, the physical, animated face and/or body may appear to be a real object within the performance area 16 that may appear to move within the performance area 16.

In some embodiments, the performance area 16 may include a mirror that reflects the guest 18 and/or objects adjacent to the guest 18 (e.g., objects within the viewing area 14). The guest 18 may simultaneously view the reflected images on the mirror and the augmented reality imagery 38 on the semi-transparent mirror 22, such that the reflected images (e.g., the reflected images of the guest 18 and the objects adjacent to the guest 18) and the augmented reality imagery 38 appear to be part of the same image or animation.

To enable greater interaction between the guest 18 and the augmented reality system 12 (e.g., the objects 20 and the augmented reality imagery 38 viewed by the guest 18), the guest-tracking sensor 32 may facilitate modifying or maintaining the augmented reality imagery 38 based on a position of the guest's head such that the augmented reality imagery 38 appears real and the semi-transparent mirror 22 appears to be invisible from the guest's perspective (e.g., the Pepper's ghost effect). Specifically, for example, the augmented reality imagery 38 may be modified to provide a proper perspective based on a position of the guest 18. In certain embodiments, the guest-tracking sensor 32 may determine the position of other portions of the guest 18, such as a position of a general position of the guest 18, position(s) of eyes of the guest 18 (e.g., via an infrared light used to track eyes), position(s) of facial features of the guest 18, and/or body movement of the guest 18. As illustrated, the guest-tracking sensor 32 may determine the position of the guest's head within a detectable area 42 (e.g., defined by dashed lines 44). The detectable area 42 may include all or some of the viewing area 14. In certain embodiments, the guest-tracking sensor 32 may determine a position of a vehicle carrying the guest 18 to determine the position of the guest 18. As illustrated, the guest-tracking sensor 32 is mounted to a beam 46 generally above the semi-transparent mirror 22. The beam 42 may be part of a structure of the amusement ride system 10. In certain embodiments, the guest-tracking sensor 32 may be mounted to other portions of the amusement ride system 10 (e.g., the semi-transparent mirror 22).

The guest-tracking sensor 32 may include any suitable sensor that determines the position of the guest's head or of another portion of the guest 18. For example, the guest-tracking sensor 32 may include a camera that detects the guest's head, skeletal features, body movement, eyes, facial features, and/or other portions of the guest 18. In some embodiments, the 3D eyewear 34 may include a marker that is detectable by the guest-tracking sensor 32. For example, the marker may include a Quick Response ("QR") code, a bar code, or another detectable marker (e.g., a retroreflective mark that reflects infrared light). The guest-tracking sensor 32 disposed on the beam 46 or disposed elsewhere in the amusement ride system 10 apart from the guest 18 may detect the marker (e.g., the QR code) to determine the position of the guest's head. Further, although tracking of the guest's head is described throughout the present disclosure, such tracking is an example of various other means that may indicate and/or provide information regarding the guest's head and/or eyes.

The guest-tracking sensor 32 may output a signal indicative of the position of the guest's head to a controller of the augmented reality system 12. For example, while the guest 18 is disposed within the viewing area 14, the guest-tracking sensor 32 may determine the position of the guest's head and may output the signal indicative of the position of the guest's head to the controller. The controller of the augmented reality system 12 may then adjust the augmented reality imagery 38 displayed on the semi-transparent mirror 22 (e.g., by adjusting the imagery 36 projected by the projector 26) based on the position of the guest's head to maintain the augmented reality imagery 38. As the guest 18 moves around the viewing area 14 and/or relative to the semi-transparent mirror 22, the controller updates the augmented reality imagery 38 based on the changed position of the guest's head. When viewed through the 3D eyewear 34 by the guest 18, the 3D environment of the augmented reality imagery 38 may appear to move relative to the objects 20 as the guest 18 moves. For example, certain portions of the 3D environment (e.g., plants, characters, weather) may appear to move relative to each other and relative to the objects 20 as the guest 18 moves. Portions of the augmented reality imagery 38 that appear to be closer to the guest 18 from the perspective of the guest 18 may appear to move more (e.g., may have a greater parallax) than portions of the augmented reality imagery 38 that appear to be farther from the guest 18. As such, a parallax effect of the augmented reality imagery 38 and/or of the objects 20 may be generated from the perspective of the guest 18. The parallax effect enables the augmented reality system 12 to simulate 3D movement of portions of the augmented reality imagery 38 (e.g., the scenery 39 and the bird 40) relative to one another and to simulate 3D movement of the objects 20 relative to portions of the augmented reality imagery 38.

In some embodiments, the augmented reality system 12 may include additional cameras that film the augmented reality effects (e.g., the objects 20, the augmented reality imagery 38, and/or the guest 18) and/or other portion(s) of the amusement ride system 10. Additionally, the augmented reality system 12 may include sensors that track positions of the cameras to enable the augmented reality system 12 to accurately portray the augmented reality effects from the perspectives of the cameras. For example, the controller described herein may provide and/or update the augmented reality imagery 38 based on the locations of the cameras.

In certain embodiments, the augmented reality system 12 may include an object-tracking sensor to track a position of the object 20 within the performance area 16. For example, the object-tracking sensor may determine a position of an entertainer (e.g., as represented by object 20) in the illustrated embodiment. The object-tracking sensor may output a signal indicative of the position of the object 20 to the controller of the augmented reality system 12. The controller may adjust the augmented reality imagery 38 displayed on the semi-transparent mirror 22 based on the sensor signal (e.g., based on the position of the object 20). For example, if the object 20 moves from a first position to a second position within the performance area 16, the controller may receive signals indicative of the first and second positions from the object-tracking sensor. Based on the positions of the object 20 (e.g., the first position and the second position), the controller may adjust the augmented reality imagery 38 on the semi-transparent mirror 22. The controller may occlude certain portions of the augmented reality imagery 38 to make the object 20 appear at different depths within the augmented reality imagery 38. As such, the object-tracking sensor may enable the object 20 to interact with the augmented reality imagery 38 from the perspective of the guest 18. The object-tracking sensor may be disposed generally above the performance area 16 (e.g., on the beam 46 adjacent to the guest-tracking sensor 32) or at another location within the amusement ride system 10.

In certain embodiments, the amusement ride system 10 may include multiple objects 20 (e.g., multiple entertainers, multiple props, multiple animals, or a combination thereof) within the performance area 16. In such embodiments, the object-tracking sensor may determine and track positions of each object 20 within the performance area 16. For example, each object 20 within the performance area 16 may include a marker (e.g., the QR code) that is detectable by the object-tracking sensor. The object-tracking sensor may determine the respective position of each object 20 based on the respective positions of the markers. In certain embodiments, the augmented reality system 12 may include an individual object-tracking sensor for each object 20 (e.g., multiple object-tracking sensors). Each object-tracking sensor may output a signal indicative of a position of a respective object 20 to the controller. The augmented reality system 12 may provide the augmented reality imagery 38 for viewing by the guest 18 such that the guest 18 may view the augmented reality imagery 38 and the multiple objects 20. The multiple objects 20 may appear to interact with the augmented reality imagery 38 from the perspective of the guest 18. For example, the guest 18 viewing the augmented reality imagery 38 through the 3D eyewear 34 may view the objects 20 interacting with the 3D environment of the augmented reality imagery 38 (e.g., with the scenery 39 and the bird 40).

In certain embodiments, the amusement ride system 10 may have multiple guests 18 positioned within the viewing area 14. The multiple guests 18 may view a single semi-transparent mirror 22 or may view separate, individual semi-transparent mirrors 22. For embodiments with multiple guests 18, the augmented reality system 12 may include multiple guest-tracking sensors 32 (e.g., an individual guest-tracking sensor 32 for each respective guest 18). Further, the amusement ride system 10 may include multiple augmented reality systems 12 (e.g., an individual augmented reality system 12 for each respective guest 18). Each augmented reality system 12 may provide a separate augmented reality imagery 38 for viewing by a respective guest 18. Additionally, each guest 18 may view the augmented reality imagery 38 through an independent 3D eyewear 34.

In certain embodiments with the single semi-transparent mirror 22 and multiple guests 18, the augmented reality system 12, via the controller, may determine an average position of the guests 18 (e.g., an average position of two guests 18). For example, the controller may receive signals from a single guest-tracking sensor 32 or from multiple guest-tracking sensors 32, each signal indicative of a respective position of a respective guest 18. The controller may determine an average position of the positions of the guest 18. Based on the average position, the controller may provide the imagery 36 to the projector 26. The projector 26 may project the imagery 36 to be reflected as the augmented reality imagery 38 by the semi-transparent mirror 22. The multiple guests 18 may view the object 20 and the augmented reality imagery 38, and the object 20 may appear to interact with the augmented reality imagery 38 from the respective perspectives of the multiple guests 18.

In some embodiments with the single semi-transparent mirror 22 and multiple guests 18, the augmented reality system 12 may generate separate, individual augmented reality imagery 38 for each guest 18. Each guest 18 may view only the respective augmented reality imagery 38 generated for their perspective. For example, each respective augmented reality imagery 38 may include individual, timesequenced images provided specifically for a specific guest 18. Additionally, the semi-transparent mirror 22 may display each of the augmented reality imagery 38 in sequence. For example, in an embodiment with four guests 18 viewing the semi-transparent mirror 22, the augmented reality system 12 may provide four sets of augmented reality imagery 38. The semi-transparent mirror 22 may display a frame of each augmented reality imagery 38 (e.g., sets of four frames) for viewing by the guests 18. The 3D eyewear 34 may allow the guests 18 to view only their respective augmented reality imagery 38. For example, the 3D eyewear 34 may allow a respective guest 18 to view each frame of their respective augmented reality imagery 38 and may block the view of the respective guest 18 for the frames including the other augmented reality imagery 38 (e.g., the 3D eyewear 34 may include a shuttering mechanism that allows the guest 18 to view only the frames of their respective augmented reality imagery 38 and blocks the other frames). Each respective guest 18 of the four guests 18 would view every fourth frame provided by the semi-transparent mirror 22. Further, the semi-transparent mirror 22 may provide the frames of the augmented reality imagery 38 at a high rate (e.g., 240 frames per second) such that the frames and the augmented reality imagery 38 viewed by each guest 18 appear to be continuous animations. That is, the guests 18 may not notice that their view is blocked for three out of every four frames due to the high rate of the frames. As such, each guest 18 may experience unique and individual augmented reality imagery 38 within the amusement ride system 10.

Figure 2:
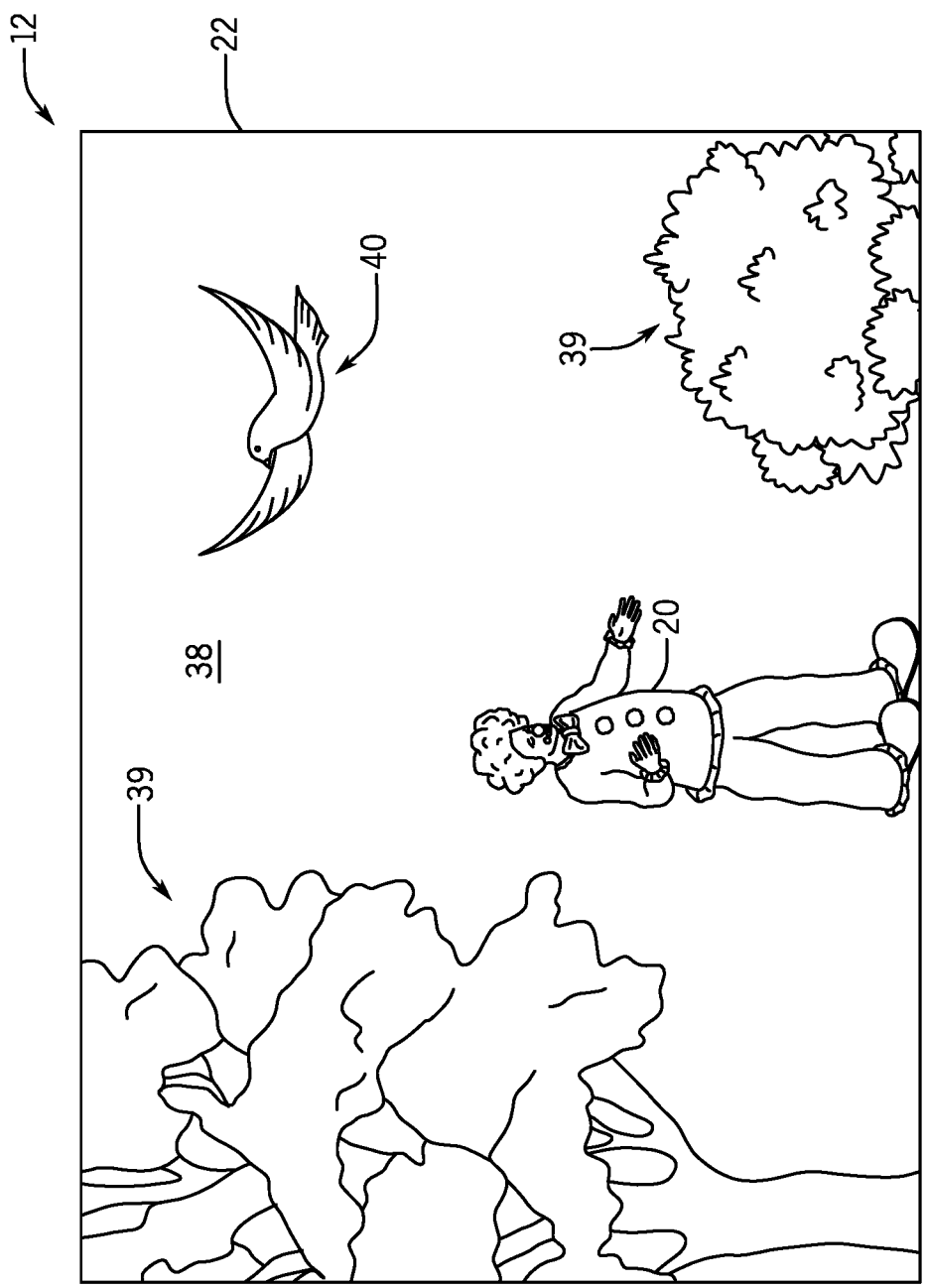
FIG. 2 is a front view of an embodiment of the augmented reality system of FIG. 1 that generates and displays augmented reality imagery.

FIG. 2 is a front perspective view of an embodiment of the augmented reality system 12 and the augmented reality imagery 38 on the semi-transparent mirror 22 of FIG. 1. The view of FIG. 2 may be the perspective of the guest 18 positioned within the viewing area 14. The object 20 may appear to be a part of the augmented reality imagery 38 from the perspective of the guest 18. For example, the object 20 may appear to be positioned beside the scenery 39 of the augmented reality imagery 38, and the bird 40 may appear to be flying over the object 20. However, as described above with respect to FIG. 1, the object 20 may actually be positioned within the performance area 16 and behind the semi-transparent mirror 22 and the augmented reality imagery 38. Further, while the augmented reality system 12 includes the semi-transparent mirror 22 in the illustrated embodiment, the guest 18 may not notice the semi-transparent mirror 22. For example, the guest 18 may view only the augmented reality imagery 38 on the semi-transparent mirror 22 and may not view other portions (e.g., edges and mounting features) of the semi-transparent mirror 22. The amusement ride system 10 may include lighting effects and/or structures that hide the other portions of the semi-transparent mirror 22 from the view of the guest 18.

As the guest 18 views the augmented reality imagery 38 and the object 20 with the 3D eyewear 34, the object 20 may appear to be part of the 3D environment of the augmented reality imagery 38. Further, the controller of the augmented reality system 12 may adjust the augmented reality imagery 38 such that the object 20 appears to move around the 3D environment of the augmented reality imagery 38 (e.g., the scenery 39 and bird 40) from the perspective of the guest 18 wearing the 3D eyewear 34. For example, the guest-tracking sensor 32 may determine the position of the guest's head relative to the semi-transparent mirror 22 and/or relative to the object 20, and the controller may update the augmented reality imagery 38 based on the relative position of the guest's head. Additionally, the object-tracking sensor may determine the position of the object 20, and the controller may update the augmented reality imagery 38 based on the relative position of the object 20. The augmented reality system 12 may provide the parallax effect that includes the portions of the 3D environment appearing closer to the guest 18 moving more (e.g., having a greater parallax) compared to portions of the 3D environment appearing farther from the guest 18 (which may have a lesser parallax). The amount of movement of the respective portions of the augmented reality system 38 (e.g., the amount of parallax) may depend on the relative positions of the guest's head, the object 20, the semi-transparent mirror 22, and/or the portions of the augmented reality imagery 38 (e.g., the 3D environment of the augmented reality imagery 38). The object 20 may appear to interact with the 3D environment of the augmented reality imagery 38 from the perspective of the guest 18 wearing the 3D eyewear 34 as the guest 18 moves around the viewing area 14. As such, the augmented reality system 12 may provide and update the augmented reality imagery 38 to provide an interactive and entertaining environment for the guest 18.

Figure 3:
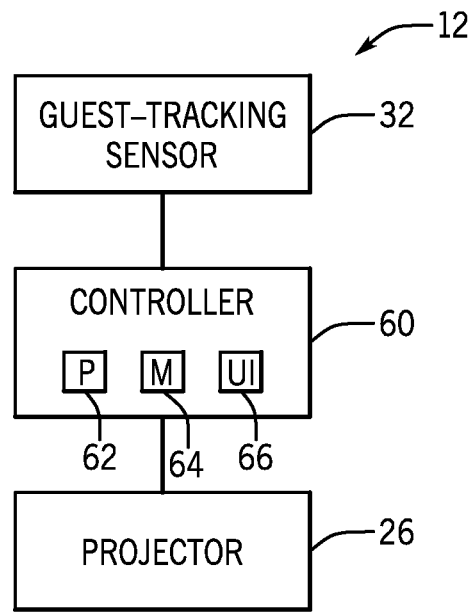
FIG. 3 is a block diagram of an embodiment of the augmented reality system of FIG. 1.

FIG. 3 is a block diagram of an embodiment of the augmented reality system 12 of FIG. 1. As illustrated, the guest-tracking sensor 32 and the projector 26 are each communicatively coupled to a controller 60 of the augmented reality system 12. The controller 60 includes a processor 62, a memory 64, and a user interface 66. The controller 60 may control the imagery 36 provided to projector 26 of FIG. 1 based on signals received from the guest-tracking sensor 32. For example, the guest-tracking sensor 32 may determine the position of the guest's head and may output a sensor signal indicative of the position of the guest's head to the controller 60. Based on the position of the guest's head, the controller 60, via the processor 62, may generate and/or update image data indicative of the imagery 36 to be reflected as the augmented reality imagery 38. The update to the imagery 36 may include the parallax effect described above that includes the portions of the augmented reality imagery 38 appearing closer to the guest 18 moving more than the portions of the augmented reality imagery 38 appearing farther from the guest 18. The controller 60 may output a control signal indicative of the image data to the projector 26. Based on the control signal indicative of the image data received from the controller 60, the projector 26 may project and/or update the imagery 36 to provide the augmented reality imagery 38 on the semi-transparent mirror 22. Further, as described above, the imagery 36 may include a pair of images that, when projected onto the semi-transparent mirror 22 as the augmented reality imagery 38 and viewed through the 3D eyewear 34, appear to be the 3D environment. The guest 18 may experience the parallax effect such that, as the guest 18 moves their head, the portions of the augmented reality imagery 38 move relative to one another and relative to the object 20.

The controller 60 may cause the projector 26 to initially start providing the imagery 36 based on certain factors. For example, the controller 60 may receive an input to the user interface 66 indicative of instructions to begin providing the imagery 36. In response, the controller 60 may output a control signal to the guest-tracking sensor 32 to cause the guest-tracking sensor 32 to begin tracking/determining the position of the guest's head. Based on an initial sensor signal indicative of an initial position of the guest's head, the controller 60 may output the control signal indicative of the image data to the projector 26. In certain embodiments, the augmented reality system 12 may automatically determine the presence and position of the guest's head, via the guest-tracking sensor 32, and the controller 60 may automatically cause the projector 26 to provide the imagery 36 to be reflected as the augmented reality imagery 38 for viewing by the guest 18 without an input to the user interface 66.

The guest-tracking sensor 32 may continually detect the position of the guest's head and may output the sensor signals to the controller 60 indicative of the position of the guest's head. In response, the controller 60 may update the image data based on the position of the guest's head and may output control signals indicative of the updated image data to the projector 26. The projector 26 may provide the updated imagery 36 to the semi-transparent mirror 22 based on the updated image data (e.g., the projector 26 projects the imagery 36 that is reflected by the semi-transparent mirror 22 as the augmented reality imagery 38) for viewing by the guest 18. Portions of the updated augmented reality imagery 38 may appear to move compared the previous augmented reality imagery 38 that was provided by the controller 60. As such, the augmented reality system 12, via the controller 60, may provide the parallax effect such that the portions of the augmented reality imagery 38 move relative to the object 20 and relative to one another from the perspective of the guest 18 wearing the 3D eyewear 34. The augmented reality system 12 may stop providing the augmented reality imagery 38 based on a user input to the user interface 66, based on an elapsed time period, based on the guest-tracking sensor 32 no longer detecting the position of the guest's head, and/or based on other factors.

In certain embodiments, the controller 60 may be communicatively coupled to other portions of the augmented reality system 12. For example, the controller 60 may be communicatively coupled to the object-tracking sensor described above such that the controller 60 may receive the signals indicative of the position of the object 20 from the object-tracking sensor and may generate/update the image data based on the position of the object 20. Additionally, the controller 60 may be communicatively coupled to the semi-transparent mirror 22. For example, in the embodiment with the semi-transparent mirror 22 displaying the imagery 36 (e.g., directly providing the augmented reality imagery 38) for viewing by the guest 18 (e.g., the projector 26 is included in the semi-transparent mirror 22), the controller 60 may output the signals indicative of the image data to the semi-transparent mirror 22. In response, the semi-transparent mirror 22 may display the augmented reality imagery 38 for viewing by the guest 18. Further, the controller 60 may be communicatively coupled to the 3D eyewear 34 of FIG. 1.

In certain embodiments, the amusement ride system 10 and/or the augmented reality system 12 may include additional controllers, processors, and/or memories to perform various functions. For example, in an embodiment with multiple semi-transparent mirrors 22, each semi-transparent mirror 22 may include a controller that receives signals from the guest-tracking sensor 32, controls the augmented reality imagery 38 on the respective semi-transparent mirror 22, and/or communicates with the controller 60. In some embodiments, the memory 64 and other memories of the amusement ride system 10 may include one or more tangible, non-transitory, computer-readable media that store instructions executable by the processor 62 and/or data to be processed by the processor 62. For example, the memory 64 may include random access memory (RAM), read-only memory (ROM), rewritable non-volatile memory such as flash memory, hard drives, optical discs, and/or other types of memory. Additionally, the processor 62 and other processors of the amusement ride system 10 may include one or more general purpose microprocessors, one or more application-specific integrated circuits (ASICs), and/or one or more field programmable gate arrays (FPGAs).

The user interface 66 may facilitate communication between the controller 60 and a user (e.g., an operator). The user interface 66 may be disposed adjacent to the amusement ride system 10 or at a remote location in the case of a remotely controlled or autonomously operated amusement ride system. For example, the user interface 66 may include one or more of a button, a keyboard, a mouse, a trackpad, and/or the like to allow user interaction with the controller 60. Additionally, the user interface 66 may include an electronic display to provide a visual representation of information, for example, via a graphical user interface (GUI), an application interface, text, a still image, video content, or a combination thereof. The user interface 66 may receive inputs from the user (e.g., the operator of the amusement ride system 10 and/or the augmented reality system 12). For example, the inputs to the user interface 66 may include desired augmented reality effects to be provided by the augmented reality system 12 within the amusement ride 10.

The guest-tracking sensor 32 and/or the projector 26 may be connected to and communicatively coupled with the controller 60 via a wired connection (e.g., Ethernet, universal serial bus (USB), canbus, or ISObus). For example, the guest-tracking sensor 32 may output signals to, and the projector 26 receive signals from, the controller 60 via the wired connection. Additionally or alternatively, the guest-tracking sensor 32 and/or the projector 26 may communicate with the controller 60 via a wireless connection. For example, the projector 26 may include a transceiver that receives signals from a controller transceiver of the controller 60. Each of the projector 32 transceiver and the controller transceiver may utilize any suitable wireless communication protocol, such as a standard protocol (e.g., Wi-Fi or Bluetooth), or a proprietary protocol.

Figure 4:
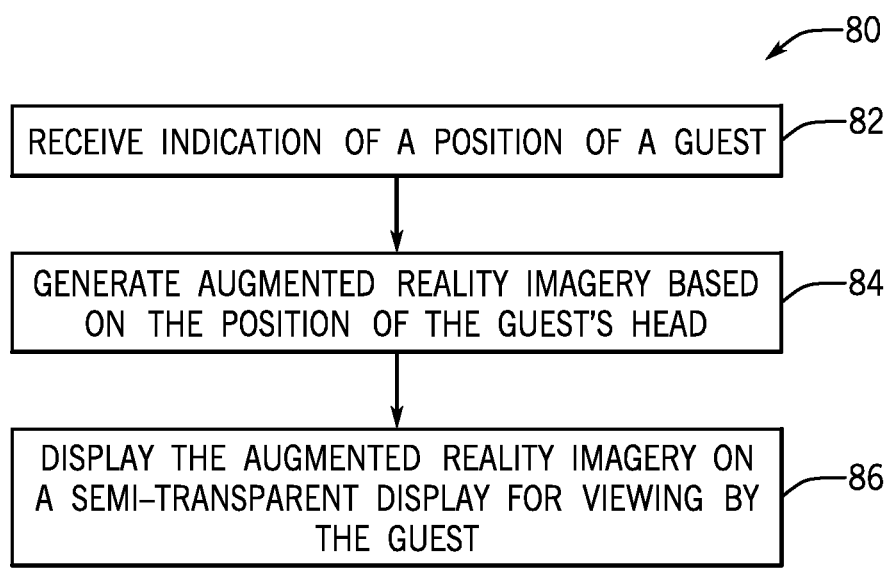
FIG. 4 is a flow chart of an embodiment of a process for generating and displaying augmented reality imagery using the augmented reality system of FIG. 1, in accordance with an aspect of the present disclosure.

FIG. 4 is a flow diagram of an embodiment of a process 80 for generating and displaying the augmented reality imagery 38 using the augmented reality system 12 of FIG. 1. As illustrated, the augmented reality system 12 first receives an indication of a position of the guest's head (block 82). For example, the guest-tracking sensor 32 may determine the position of the guest's head and may output the sensor signal indicative of the position of the guest's head to the controller 60 of FIG. 2. The controller 60 may receive the sensor signal.

Next, the augmented reality system 12 may generate the augmented reality imagery 38 based on the position of the guest's head (block 84). For example, the controller 60 may output a control signal indicative of the image data based on the sensor signal indicative of the position of the guest's head received from the guest-tracking sensor 32 (e.g., the augmented reality system 12 may provide the parallax effect via the controller 60). The controller 60 may provide the image data such that, when the imagery 36 is reflected as the augmented reality imagery 38, the object 20 appears to interact with the augmented reality imagery 38 from the perspective of the guest 18. The object 20 may appear to be part of the 3D environment of the augmented reality imagery 38 from the perspective of the guest 18 wearing the 3D eyewear 34. In certain embodiments, the controller 60 may receive the sensor signal indicative of the position of the object 20 from the object-tracking sensor. The controller 60 may provide the image data based on both the position of the object 20 and the position of the guest's head. As the respective positions of the guest 18 and the object 20 change, the controller 60 may adjust the image data such that portions of the reflected augmented reality imagery 38 that appear to be closer to the guest 18 may move more (e.g., may have a greater parallax) than portions of the 3D environment that appear to be farther from the guest 18. As such, the controller 60 may provide the parallax effect that includes the object 20 and/or portions of the augmented reality imagery 38 moving relative to one another from the perspective of the guest 18.

Further, the augmented reality system 12 may display the augmented reality imagery 38 on the semi-transparent mirror 22 for viewing by the guest 18 (block 86). For example, the projector 26 may project the imagery 36, which may be reflected by the mirror 22 as the augmented reality imagery 38 for viewing by the guest 18. The guest 18 may simultaneously view the object 20 and the augmented reality imagery 38 such that the object 20 and the augmented reality imagery 38 appear to be part of the same imagery (e.g., appear to be part of the same 3D environment when viewed through the 3D eyewear 34).

The augmented reality system 12 may iteratively repeat the process 80 while the guest 18 is positioned within the viewing area 14 and/or while the guest 18 is viewing the semi-transparent mirror 22. For example, after providing an initial augmented reality imagery 38 for viewing by the guest, the augmented reality system 12 may repeat each of blocks 82, 84, and 86 to update the augmented reality imagery 38 based on updated positions of the guest 18. In certain embodiments, the augmented reality system 12 may update the augmented reality imagery 38 based on updated positions of the objects within the performance area 16 (e.g., based on updated positions of the objects detected by the object-detecting sensor). With each iteration of the process 80, the object 20 may appear to interact with the augmented reality imagery 38 from the perspective of the guest 18 wearing the 3D eyewear 34.

Accordingly, the amusement ride system 10 and the augmented reality system 12 of FIG. 1 provide an entertaining and interactive environment for the guest 18. For example, to replicate or simulate augmented reality effects without using an augmented reality headset, the augmented reality system 12 may include the projector 26 that projects the imagery 36 that may appear to be 3D imagery or the 3D environment when viewed with the 3D eyewear 34 (e.g., the 3D glasses). The imagery 36 may be reflected by the semi-transparent mirror 22 as the augmented reality imagery 38. The guest 18 may view the augmented reality imagery 38 as the 3D environment using the 3D eyewear 34. The semi-transparent mirror 22 may be positioned at the angle 41 relative to the projector 26 to create the Pepper's ghost effect, which may cause the 3D imagery to appear overlaid on top of the objects 20 behind the semi-transparent mirror 22.

Further, the guest's head may be tracked by the guest-tracking sensor 32, and the position of the guest's head relative to the semi-transparent mirror 22 and the objects 20 may be used to update the augmented reality imagery 38 (e.g., the 3D image/environment) displayed on the semi-transparent mirror 22. For example, as the guest 18 moves their head, the 3D imagery may include the parallax effect that accurately moves portions of the 3D imagery relative to one another and relative to the objects 20 (e.g., portions of the 3D imagery that appear closer to the guest 18 may move more than portions of the 3D imagery that appear farther from the guest 18). In this manner, an augmented reality effect may be generated that is viewable by the guest 18 when merely wearing lightweight 3D glasses (e.g., the 3D eyewear 34), instead of an augmented reality headset. As such, the amusement ride system 10 and the augmented reality system 12 provide an interactive 3D environment with generated images (e.g., the augmented reality imagery 38) and actual objects (e.g., the object 20) for the enjoyment of the guest 18 wearing the 3D eyewear 34.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An augmented reality system for an amusement ride, comprising:
    a guest-tracking sensor configured to determine a position of a guest;
    a projector configured to project imagery;
    a semi-transparent mirror configured to reflect the imagery as augmented reality imagery, wherein the guest is disposed on a first side of the semi-transparent mirror; and
    a controller comprising a processor and a memory, wherein the controller is configured to:
        receive a first sensor signal indicative of a first position of the guest from the guest-tracking sensor;
        generate image data based on the first position of the guest;
        output a first control signal indicative of the image data to the projector, wherein the projector is configured to project the imagery based on the first control signal indicative of the image data;
        receive a second sensor signal indicative of a second position of the guest from the guest-tracking sensor;
        update the image data as updated image data in response to receiving the second sensor signal; and
        output a second control signal indicative of the updated image data to the projector, wherein the projector is configured to project updated imagery based on the second control signal, and wherein the updated imagery causes the augmented reality imagery to appear to move relative to an object disposed on a second side of the semi-transparent mirror opposite the first side via a parallax effect.

2. The augmented reality system of claim 1, wherein the imagery is configured to appear as three-dimensional (3D) imagery when viewed through 3D eyewear, wherein the 3D eyewear comprises stereoscopic glasses that enable viewing the imagery as the 3D imagery.

3. The augmented reality system of claim 2, wherein the augmented reality imagery is configured to interact with the object from a perspective of the guest.

4. The augmented reality system of claim 2, comprising the 3D eyewear, wherein the 3D eyewear is configured to cause the augmented reality imagery to appear as the 3D imagery from a perspective of the guest wearing the 3D eyewear.

5. The augmented reality system of claim 1, wherein the controller is configured to iteratively update the imagery based on the position of the guest.

6. The augmented reality system of claim 1, wherein the controller is configured to generate the imagery based on a user input, a time sequence, or a combination thereof.

7. The augmented reality system of claim 1, wherein the guest-tracking sensor is configured to detect retro-reflected infrared light.

8. The augmented reality system of claim 1, wherein the semi-transparent mirror is disposed between a 30 degree and a 60 degree angle relative to the projector.

9. The augmented reality system of claim 1, wherein the projector is disposed above or below the semi-transparent mirror and is hidden from a perspective of the guest.

10. The augmented reality system of claim 1, wherein the controller is configured to update the image data by moving a first portion of the augmented reality imagery more than a second portion of the augmented reality imagery, wherein the first portion of the augmented reality imagery appears to be farther from the guest relative to the second portion of the augmented reality imagery.

11. The augmented reality system of claim 1, wherein the first position of the guest and the second position of the guest comprise positions of the guest's head, eyes, one or more facial features, another portion of the guest, or any combination thereof.

12. The augmented reality system of claim 1, wherein the controller is configured to:
receive a third sensor signal indicative of an absence of the guest on the first side of the semi-transparent mirror; and
output a third control signal indicative of instructions to stop providing the imagery or the updated imagery to the projector, wherein the projector is configured to stop projecting the imagery or the updated imagery based on the third control signal.

13. A method for generating augmented reality imagery for an amusement ride, comprising:
receiving an indication of a first position of a guest;
generating, in response to receiving the indication of the first position of the guest, image data based on the first position of the guest;
projecting imagery, based on the image data, onto a semi-transparent mirror, wherein the guest is disposed on a first side of the semi-transparent mirror;
reflecting the imagery as augmented reality imagery toward the guest for viewing by the guest, wherein the augmented reality imagery appears as three-dimensional (3D) imagery when viewed through 3D eyewear, wherein the 3D eyewear comprises stereoscopic glasses that enable viewing the augmented reality imagery as the 3D imagery;
receiving an indication of a second position of the guest;
updating the image data as updated image data in response to receiving the indication of the second position of the guest;
projecting updated imagery, based on the updated image data, onto the semi-transparent mirror; and
reflecting the updated imagery as the augmented reality imagery toward the guest for viewing by the guest, wherein the updated imagery causes the augmented reality imagery to appear to move relative to an object disposed on a second side of the semi-transparent mirror opposite the first side via a parallax effect.

14. The method of claim 13, wherein the imagery comprises two or more two-dimensional (2D) images configured to appear as the 3D imagery when viewed through the 3D eyewear.

15. The method of claim 13, comprising receiving an indication of a position of the object located on the second side of the semi-transparent mirror.

16. The method of claim 15, comprising adjusting the image data based on the position of the object.

17. An augmented reality system for an amusement ride, comprising:
a guest-tracking sensor configured to determine a position of a guest;
a three-dimensional (3D) projector configured to project imagery;
a semi-transparent mirror configured to reflect the imagery as augmented reality imagery, wherein the guest is disposed on a first side of the semi-transparent mirror;
3D eyewear comprising stereoscopic glasses configured to enable viewing the augmented reality imagery as a 3D environment; and
a controller comprising a processor and a memory, wherein the controller is configured to:
receive a first sensor signal indicative of a first position of the guest from the guest-tracking sensor;
generate image data based on the first position of the guest; and
output a first control signal indicative of the image data to the 3D projector such that the first control signal causes the 3D projector to project the imagery onto the semi-transparent mirror based on the image data;
receive a second sensor signal indicative of a second position of the guest from the guest-tracking sensor;
update the image data as updated image data in response to receiving the second sensor signal; and
output a second control signal indicative of the updated image data to the projector, wherein the projector is configured to project updated imagery based on the second control signal, and the updated imagery causes the augmented reality imagery to appear to move relative to an object disposed on a second side of the semi-transparent mirror opposite the first side via a parallax effect.

18. The augmented reality system of claim 17, wherein the guest-tracking sensor comprises a marker disposed within the 3D eyewear, and the marker is configured to transmit positional data indicative of the position of the guest.

19. The augmented reality system of claim 18, wherein the marker comprises a Quick Response ("QR") code, a bar code, or a retroreflective marker that reflects infrared light.

20. The augmented reality system of claim 17, wherein the guest-tracking sensor comprises a camera configured to determine the position of the guest.

* * * * *